(12) United States Patent
Kamenoue

(10) Patent No.: US 8,592,685 B2
(45) Date of Patent: Nov. 26, 2013

(54) WIRING HARNESS INSTALLATION STRUCTURE FOR VEHICLE

(75) Inventor: Masayoshi Kamenoue, Hiroshima (JP)

(73) Assignee: Yazaki Corporation, Tokyo (JP)

( * ) Notice: Subject to any disclaimer, the term of this patent is extended or adjusted under 35 U.S.C. 154(b) by 476 days.

(21) Appl. No.: 12/919,879

(22) PCT Filed: Feb. 26, 2009

(86) PCT No.: PCT/JP2009/053604
§ 371 (c)(1),
(2), (4) Date: Nov. 23, 2010

(87) PCT Pub. No.: WO2009/107749
PCT Pub. Date: Sep. 3, 2009

(65) Prior Publication Data
US 2011/0056730 A1    Mar. 10, 2011

(30) Foreign Application Priority Data

Feb. 28, 2008 (JP) ................................. P2008-047489

(51) Int. Cl.
*H01B 17/26* (2006.01)
(52) U.S. Cl.
USPC ............... 174/152 G; 174/153 G; 174/151; 439/274; 248/56; 16/2.1; 277/606
(58) Field of Classification Search
USPC .......... 174/152 G, 153 G, 151; 439/274, 275; 248/56; 16/2.1, 2.2; 277/606
See application file for complete search history.

(56) References Cited

U.S. PATENT DOCUMENTS

| 4,907,836 | A | | 3/1990 | Ueda et al. | |
|---|---|---|---|---|---|
| 5,092,647 | A | | 3/1992 | Ueda et al. | |
| 5,911,450 | A | * | 6/1999 | Shibata et al. | 29/407.04 |
| 6,624,361 | B2 | * | 9/2003 | Suzuki | 174/152 G |

(Continued)

FOREIGN PATENT DOCUMENTS

| CN | 101102036 A | 1/2008 |
|---|---|---|
| DE | 3500359 C1 | 2/1986 |

(Continued)

OTHER PUBLICATIONS

European Search Report dated Feb. 17, 2012 issued by the European Patent Office in counterpart European Patent Application No. 09715261.5.

(Continued)

*Primary Examiner* — Dhirubhai R Patel
(74) *Attorney, Agent, or Firm* — Sughrue Mion, PLLC

(57) ABSTRACT

A wiring harness installation structure is provided which can reduce the installing cost of a wiring harness by omitting an operation of injecting a water stop agent into an interior of a grommet. A grommet 21 which is fittingly mounted in a harness through hole in a body panel 7 which separates an interior from an exterior of a vehicle compartment 1 is such that an extension tubular portion 25 of a required length which is fittingly connected to a protector 13 which lies adjacent to the grommet 21 is provided at a vehicle compartment exterior area side end portion 23a of a panel fitting tubular portion 23 through a center of which a wiring harness W is inserted, whereby an exposure of the wiring harness W in proximity to the grommet 21 is prevented by the extension tubular portion 25.

3 Claims, 2 Drawing Sheets

(56) References Cited

U.S. PATENT DOCUMENTS

| | | | |
|---|---|---|---|
| 7,547,059 B2 * | 6/2009 | Delaine | 296/146.9 |
| 7,659,480 B2 * | 2/2010 | Bikhleyzer | 174/153 G |
| 2006/0219446 A1 | 10/2006 | Delaine | |
| 2007/0137884 A1 | 6/2007 | Fuller et al. | |
| 2008/0009175 A1 | 1/2008 | Kamenoue et al. | |

FOREIGN PATENT DOCUMENTS

| | | | |
|---|---|---|---|
| GB | 2164609 A | 3/1986 |
| JP | 6-276641 A | 9/1994 |
| JP | 06276642 A | 9/1994 |
| JP | 9-240389 A | 9/1997 |
| JP | 11-089045 A | 3/1999 |
| JP | 2000016195 A | 1/2000 |

OTHER PUBLICATIONS

International Search Report (PCT/ISA/210); issued for PCT/JP2009/053604, dated Mar. 24, 2009.

Japanese Office Action dated Aug. 14, 2012 issued in corresponding Japanese Patent Application No. 2008-047489.

Communication dated Sep. 27, 2012 from the State Intellectual Property Office of P.R. China in a counterpart application No. 200980106693.X.

Office Action, dated Sep. 13, 2013, issued by the State Intellectual Property Office of the People's Republic of China, in counterpart Application No. 200980106693.X.

* cited by examiner

WIRING HARNESS INSTALLATION STRUCTURE FOR VEHICLE

TECHNICAL FIELD

The present invention relates to a wiring harness installation structure for a vehicle and more particularly to an improvement to realize a cost reduction without decreasing the waterproofing performance.

BACKGROUND ART

FIG. 2 shows a conventional example of a wiring harness installation structure. The wiring harness installation structure shown herein is an installing construction for installing a wiring harness W so as to extend from an engine compartment 3, which constitutes an area external to a vehicle compartment 1, into an interior of the vehicle compartment 1.

A grommet made of a rubber material is fittingly mounted in a harness insertion hole 9. The harness insertion hole 9 is formed so as to penetrate through a body panel (a dash panel) 7 which is provided between the engine compartment 3 and the vehicle compartment 1 so as to separate the interior and exterior of the vehicle compartment 1. A protector 13 is installed at every key point in a harness installation path as required within the engine compartment 3, which constitutes the area external to the vehicle compartment 1.

The grommet 11 has such a configuration that the wiring harness W is inserted through a center of a cylindrical structure which is fittingly held in the harness insertion hole 9 which is formed so as to penetrate through the body panel 7. Therefore, the wiring harness W which is inserted through the harness insertion hole 9 is prevented from a direct contact with a circumferential edge of the harness insertion hole 9, which would otherwise damage the wiring harness W.

The protector 13 is a cylindrical structure for accommodating the wiring harness W for protection within the engine compartment 3 and is formed of a hard resin material, for example. The protector 13 is equipped for the purpose of preventing the wiring harness W from being subjected to water, as well as preventing the wiring harness W from being damaged through interference with a peripheral device or structure.

Normally, as is shown in the figure, the protector 13 is disposed only an appropriate distance apart from the body panel 7, and the wiring harness W is exposed between the grommet 11 and the protector 13.

Incidentally, there is a possibility that drips of water resulting from rain water or washing water infiltrates the engine compartment 3 from the outside thereof. There is a possibility that the wiring harness W exposed within the engine compartment 3 is subjected to drips of water intruded in the interior of the engine compartment 3.

Then, in order to prevent drips of water caught on the exposed portion of the wiring harness W in proximity to the grommet 11 from running through gaps defined between a large number of electric wires which makes up the wiring harness W to intrude the vehicle compartment 1 side, conventionally, a waterproofing treatment is implemented for injecting a water stop agent 15 into an interior of the grommet 11 (for example, Patent Document 1).

The water stop agent 15 is initially in a liquid condition and is injected into the gaps defined between the electric wires which are inserted through the grommet 11 to set after a predetermined time elapses, so that the gaps between the electric wires are sealed watertight, whereby even in case the wiring harness W exposed within the engine compartment 3 catches some of the drips of water, water so caught is prevented from running through the gaps between the electric wires to infiltrate the vehicle compartment 1 side.

Patent Document 1: JP-A-11-89045

DISCLOSURE OF THE INVENTION

Problem that the Invention is to Solve

However, in the wiring harness installation structure in which the water stop agent 15 is injected into the interior of the grommet 11 in the way described above, a water stop agent injecting operation area where the water stop agent 15 in a liquid condition is injected into an interior of a grommet 11 and a hardening operation area where the injected water stop agent 15 is dried to harden to be secured along a vehicle assembly line where wiring harnesses W are installed in vehicles. Therefore, more working areas have to be secured along the assembly line. This enlarges the assembly line or increase the assembling operation time, causing a problem that the wiring harness installation costs is increased largely.

An object of the invention is relevant to solving the problem and is to provide a wiring harness installation structure for a vehicle which can prevent water from running through gaps defined between electric wires inserted through a grommet fittingly mounted in a body panel which separate an interior and an exterior of a vehicle compartment of the vehicle thereby infiltrate the vehicle compartment side without injecting a water stop agent into an interior of the grommet and can reduce the wiring harness installation cost by making the assembly line smaller in size and reducing the assembling operation time by reducing the number of working areas that are to be secured at the wiring harness installing operation area along the vehicle assembly line due to omitting the assembling operation where the water stop agent is injected into the interior of the grommet.

Means for Solving the Problem

The object of the invention is attained by the following configuration.

(1) A wiring harness installation structure in which a grommet is fittingly mounted in a harness insertion hole, which is formed so as to penetrate through a body panel which separates an interior area and an exterior area of a vehicle compartment, for holding a wiring harness inserted through the harness insertion hole and a protector having a cylindrical construction which accommodates the wiring harness for protection is equipped in a harness installation path in the exterior area of the vehicle compartment, the grommet includes: a panel fitting tubular portion which is fittingly held in the harness insertion hole and through which the wiring harness is inserted: and an extension tubular portion which is formed at an end portion of the panel fitting tubular portion in a side of the exterior area of the vehicle compartment so as to extend from the end portion while surrounding a periphery of the wiring harness. The extension tubular portion has a required length to fittingly connect an end portion of the extension tubular portion to the protector which is arranged adjacent to the grommet, thereby prevent an exposure of the wiring harness from the body panel to the protector.

(2) The wiring harness installation structure for the vehicle as set forth under (1), wherein a water stop treatment is applied to a fitting portion between the protector and the extension tubular portion.

(3) The wiring harness installation structure for the vehicle as set forth under (1) or (2), wherein the other end portion of the protector, from which the wiring harness is led out, is disposed in an area being free from influence of water; and wherein the other end portion of the protector is different from an end portion of the protector to which the grommet is fitted.

Advantage of the Invention

According to the wiring harness installation structure for the vehicle under (1) of the invention, the extension tubular portion which is fittingly connected to the protector arranged adjacent to the vehicle compartment exterior area side is provided on the grommet. The grommet is fittingly mounted on the body panel which separates the interior area and the exterior area of the vehicle compartment. The wiring harness is not exposed at a portion between the grommet and the protector which is adjacent to the grommet.

Namely, the wiring harness, which is introduced into the vehicle compartment side from the exterior area of the vehicle compartment via the grommet, is not exposed to the outside in proximity to the grommet. Therefore, there occurs no such situation that a part of the wiring harness which lies in proximity to the grommet is subjected to washing water or rain water which infiltrates the exterior area of the vehicle compartment.

Consequently, there is no fear that drips of water caught on the wiring harness in proximity to the grommet run through gaps defined between electric wires configuring the wiring harness to thereby infiltrate the vehicle compartment.

Namely, even if the water stop agent is not injected into the interior of the grommet which is fittingly mounted on the body panel which separates the interior and the exterior of the vehicle compartment to thereby cover the gaps between the electric wires permeable, no water runs through the gaps between the electric wires which are inserted through the grommet to infiltrate the vehicle compartment side, whereby the injecting operation of injecting the water stop agent into the interior of the grommet can be omitted.

In addition, by omitting the injecting operation of injecting the water stop agent into the interior of the grommet, there is obviated the necessity of providing the water stop agent injecting operation area and the hardening operation area where the water stop agent injected is dried to harden at part of the vehicle assembly line where wiring harnesses are installed in vehicles by reducing the number of operation areas, and hence, by a reduction in the number of operation areas due to the omission of these operation areas along the assembly line, a reduction in size of the assembly line and a reduction in the wiring harness installation costs can be realized, thereby making it possible to reduce the wiring harness installing costs.

Additionally, in the grommet utilized in the invention, the amount of the material used such as rubber is increased by such an amount that the extension tubular portion is added, which increases the cost of the grommet alone. However, since this economical burden is far smaller than an economical advantage which can be provided by the omission of the injecting operation of the water stop agent, the increase in cost of the grommet alone can be ignored, thereby making it possible to realize not only a reduction in the wiring harness installing cost but also an increase in productivity.

Additionally, according to the wiring harness installation structure for a vehicle under (2) of the invention, no water infiltrates the interior of the extension tubular portion from the end portion of the extension tubular portion, and hence, there is no fear that water runs along the wiring harness to infiltrate the vehicle compartment interior area.

In addition, according to the wiring harness installation structure for a vehicle under (3) of the invention, no water infiltrates from the open end portion of the protector, and hence, there is no fear that water runs along the wiring harness to infiltrate the vehicle compartment interior area.

BEST MODE FOR CARRYING OUT THE INVENTION

Hereinafter, a preferred embodiment of a wiring harness installation structure for a vehicle according to the invention will be described in detail by reference to the drawings.

Figure 1:
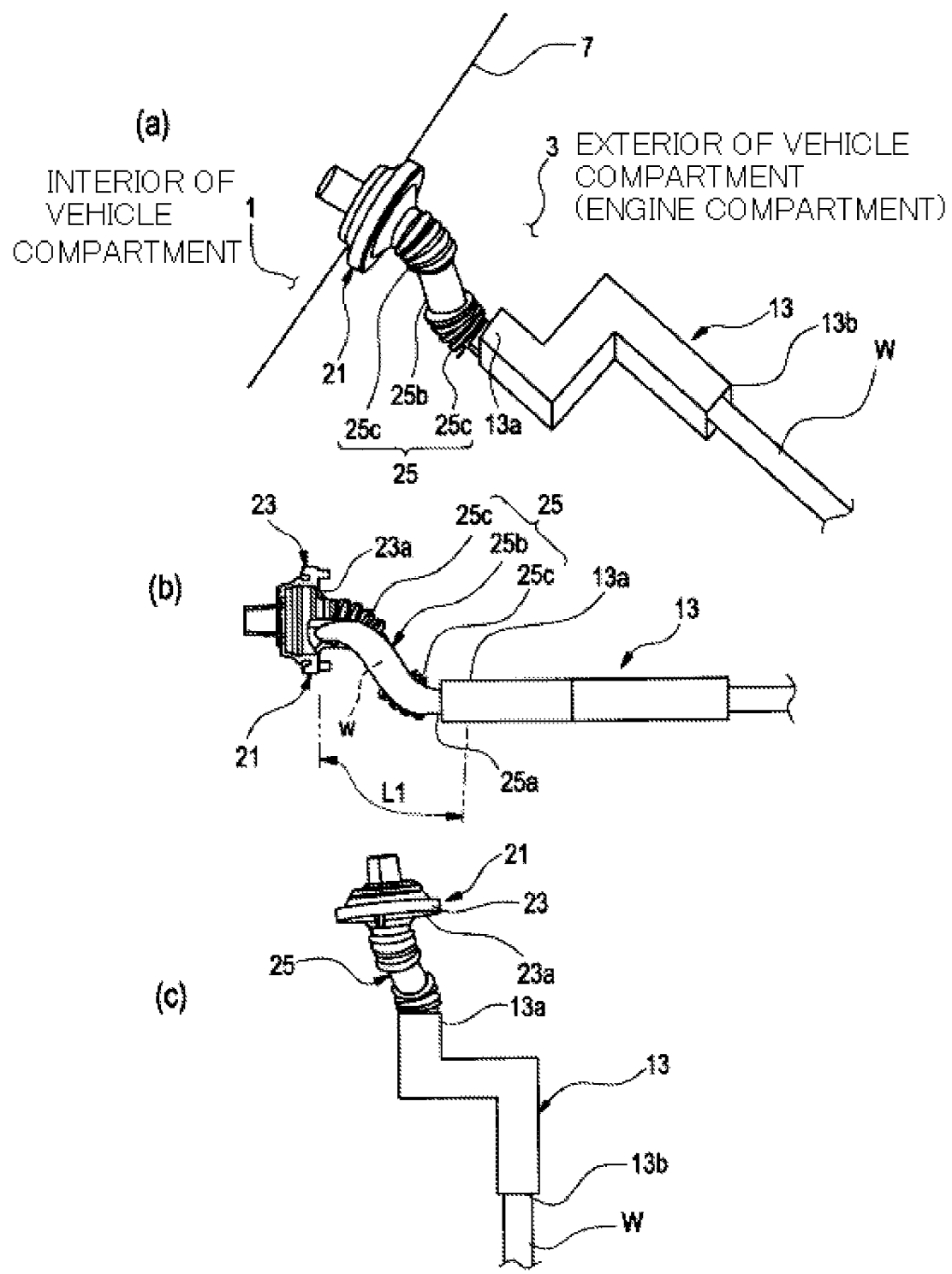
FIG. 1 (a) is a perspective view of an embodiment of a wiring harness installation structure for a vehicle according to the invention, (b) is a longitudinal sectional view of a main part of the wiring harness installation structure for a vehicle shown at FIGS. 1 (a), and (c) is a perspective view of the wiring harness installation structure for a vehicle shown in at FIG. 1 (a) from a different angle.

FIG. 1 shows an embodiment of a wiring harness installation structure for a vehicle according to the invention. FIG. 1 (a) is a perspective view of the embodiment of the wiring harness installation structure for a vehicle according to the invention, FIG. 1 (b) is a longitudinal sectional view of a main part of the wiring harness installation structure for a vehicle shown at FIG. 1 (a), and FIG. 1 (c) is a perspective view of the wiring harness installation structure for a vehicle shown in at FIG. 1 (a) from a different angle.

The wiring harness installation structure of the embodiment is an installing construction for installing a wiring harness W so as to extend from an engine compartment 3, which constitutes an area external to a vehicle compartment 1 of a vehicle, into an interior of the vehicle compartment 1.

Also, in the case of the wiring harness installation structure of this embodiment, as is shown in FIG. 1(a), a grommet 21 made of a rubber material is fittingly mounted in a harness insertion hole formed so as to penetrate through a body panel (a dash panel) 7 which separates the engine compartment 3 from the vehicle compartment 1, and a protector 13 is equipped at every key point in a harness installation path as required within the engine compartment 3 which constitutes the area external to the vehicle compartment 1.

Figure 2:
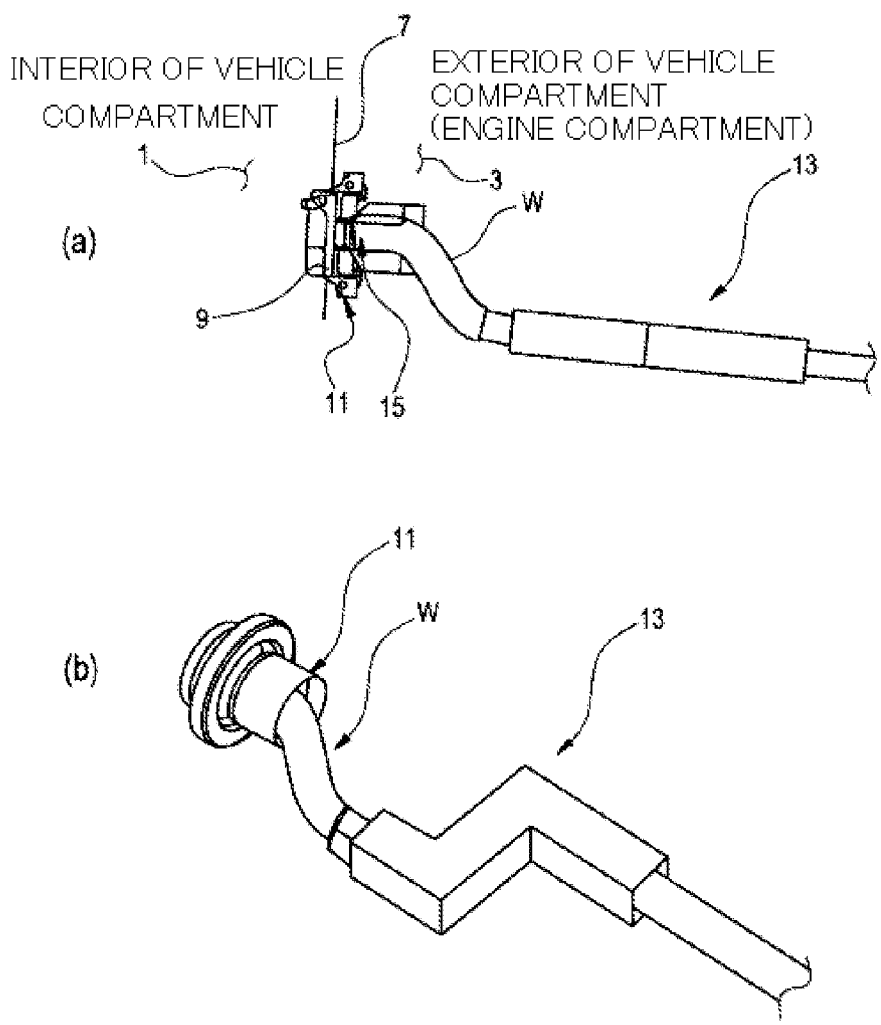
FIG. 2 (a) is a longitudinal sectional view of a conventional wiring harness installation structure for a vehicle, and (b) is a perspective view of the wiring harness installation structure for a vehicle shown at FIG. 2 (a).

The protector 13 shown in FIG. 1 is has the same configuration as that of the conventional construction shown in FIG. 2. Namely, the protector 13 is a cylindrical structure for accommodating the wiring harness W for protection within the engine compartment 3 and is formed of a hard resin material, for example, the protector 13 being equipped for the purpose of preventing the wiring harness W from being subjected to water, as well as preventing the wiring harness W from being damaged through interference with a peripheral device or structure.

In addition, as is shown in the figure, the protector 13 is disposed only an appropriate distance apart from the body panel 7.

The grommet 21 of the embodiment is identical to the conventional grommet in that the grommet 21 is fittingly held in the harness insertion hole which is formed in the body panel 7 so as to penetrate therethrough and that the wiring harness W which is inserted through the harness insertion hole is prevented from being damaged by a direct contact with a circumferential edge of the harness insertion hole.

However, the grommet 21 of the embodiment is improved in that an extension tubular portion 25 is provided at an end portion 23a of a panel fitting tubular portion 23 which lies on a vehicle compartment exterior area side thereof (namely, a side thereof which faces the engine compartment 3) for surrounding a periphery of the wiring harness W which extends out of the end portion 23a, the panel fitting tubular portion 23 being fittingly held in the harness insertion hole in the body panel 7 and enabling the wiring harness W to be inserted therethrough at a center thereof. A required length L (refer to FIG. 1(b)) is imparted to the extension tubular portion 25 which enables an end portion 25a thereof to be fittingly connected to a harness inlet/outlet opening 13a of the protector 13 which lies adjacent to the grommet 21.

A water stop treatment is preferably applied between the end portion 25a of the grommet 21 and the harness inlet/outlet opening 13a of the protector 13. As this occurs, a water stop member such as a packing which requires no drying step is preferably assembled as a water stop means rather than injecting a water stop agent which requires a drying step.

In addition, in the case of the embodiment, the extension tubular portion 25 is configured as a combination of a straight tube-like normal tubular portion 25b and a bellows tube-like flexible tubular portion 25c so that the extension tubular portion 25 can be deformed to match the installation path of the wiring harness.

Namely, in the wiring harness installation structure for a vehicle of this embodiment, the extension tubular portion 25 which is equipped to connect to the grommet 21 covers the wiring harness W to a nearest part of the protector 13 so as to prevent the exposure of part of the wiring harness W which lies in proximity to the grommet 21.

The other end portion 13b of the protector 13 is disposed in such an area that even in the event that the wiring harness is subjected to water, the other end portion 13b is free from influence by the water. As is shown in FIG. 1, the wiring harness W which is guided into the protector 13 from the grommet 21 is exposed within the engine compartment 3 at a harness inlet/outlet opening 13b at an end portion of the protector 13 which lies far apart from the grommet 21.

However, since the location where the wiring harness W is exposed within the engine compartment 3 is a position spaced quite far away from the body panel 7, even in the event that the wiring harness W is subjected to rain water or washing water which has filtrated from the outside in that position, it is considered unrealistic to happen that the water so infiltrating runs through gaps between electric wires which make up the wiring harness W to thereby infiltrate as far as the grommet 21 side.

Then, in this embodiment, a waterproofing operation step is omitted where a water stop agent is injected into an interior of the grommet 21.

Thus, as has been described heretofore, according to the wiring harness installation structure of the embodiment, the extension tubular portion 25 is equipped to the grommet 21 which is fittingly mounted in the body panel 7 which separates the interior from the exterior of the vehicle compartment 1 so as to be fittingly connected to a side of the protector 13 which lies adjacent to the engine compartment 3, which constitutes the area external to the vehicle compartment, whereby the wiring harness W is not exposed between the grommet 21 and the protector 13 which lies adjacent thereto.

Namely, the wiring harness W which is introduced into the inside of the vehicle compartment 1 from the area external to the vehicle compartment 1 via the grommet 21 is not exposed to the outside in the proximity to the grommet 21. Because of this, there occurs no such situation that part of the wiring harness which lies in proximity to the grommet 21 is subjected to washing water or rain water which infiltrates the area external to the vehicle compartment 1.

Consequently, there is no fear that drips of water caught on the wiring harness W in proximity to the grommet 21 run through the gaps defined between the electric wires making up the wiring harness W to thereby infiltrate the interior of the vehicle compartment 1.

Namely, even in the event that the water stop agent is not injected into the interior of the grommet 21 which is fittingly mounted in the body panel 7 which separates the interior from the exterior of the vehicle compartment 1 to thereby leave the gaps between the electric wires permeable, no water runs through the gaps between the electric wires which are inserted through the grommet 21 to infiltrate the vehicle compartment 1 side, whereby the injecting operation of injecting the water stop agent into the interior of the grommet can be omitted.

In addition, by omitting the injecting operation of injecting the water stop agent into the interior of the grommet 21, there is obviated the necessity of providing the water stop agent injecting operation area and the setting operation area where the water stop agent injected is dried to set at part of the vehicle assembly line where wiring harnesses are installed in vehicles by reducing the number of operation areas, and hence, by a reduction in the number of operation areas due to the omission of these operation areas along the assembly line, a reduction in size of the assembly line and a reduction in the wiring harness W installation costs can be realized, thereby making it possible to reduce the wiring harness installing costs.

Additionally, in the grommet 21 utilized in the embodiment, the amount of the material used such as rubber is increased by such an amount that the extension tubular portion 25 is added, which increases the cost of the grommet alone. However, since this economical burden is far smaller than an economical advantage which can be provided by the omission of the injecting operation of the water stop agent, the increase in cost of the grommet 21 alone can be ignored, thereby making it possible to realize not only a reduction in the wiring harness W installing cost but also an increase in productivity.

In the wiring harness installation structure according to the invention, the body panel in which the grommet is fittingly mounted is not limited to the dash panel shown in the embodiment. A back panel which separates a trunk from the vehicle compartment or a door panel which separates a door interior space from the vehicle compartment can be the panel in which the grommet according to the invention is mounted.

The invention is not limited to the embodiment that has been described heretofore but can be modified or improved freely as required. In addition, the materials, shapes, dimensions, numerical values, forms, numbers and disposing positions of the respective constituent elements described in the aforesaid embodiment are arbitrary and are not limited, provided that those can contribute to the attainment of the invention.

While the invention has been described in detail and by reference to the specific embodiment, it is obvious to those skilled in the art that various alterations or modifications can be added to the invention without departing from the spirit and scope of the invention.

The subject patent application is such as to be based on Japanese Patent Application (No. 2008-047489) filed on Feb. 28, 2008 and the contents thereof are to be incorporated herein by reference.

The invention claimed is:

1. A wiring harness installation structure in which a grommet is fittingly mounted in a harness insertion hole, which is formed so as to penetrate through a body panel which separates an interior area and an exterior area of a vehicle compartment, for holding a wiring harness inserted through the harness insertion hole and a protector having a cylindrical construction which accommodates the wiring harness for protection is equipped in a harness installation path in the exterior area of the vehicle compartment, wherein the grommet includes:

a panel fitting tubular portion which is fittingly held in the harness insertion hole and through which the wiring harness is inserted: and an extension tubular portion which is formed at an end portion of the panel fitting tubular portion in a side of the exterior area of the vehicle compartment so as to extend from the end portion while surrounding a periphery of the wiring harness, wherein the extension tubular portion has a required length to fittingly connect an end portion of the extension tubular portion to the protector which is arranged adjacent to the grommet, thereby prevent an exposure of the wiring harness from the body panel to the protector, wherein a water stop treatment is disposed on a fitting portion between the protector and the extension tubular portion, wherein the harness insertion hole formed in the body panel is higher in position than an end portion of the protector to which the grommet is fitted in order to prevent water from infiltrating the interior area.

2. The wiring harness installation structure according to claim 1, wherein the other end portion of the protector, from which the wiring harness is led out, is disposed in an area being free from influence of water; and wherein the other end portion of the protector is different from an end portion of the protector to which the grommet is fitted.

3. A grommet that prevents exposure of a wiring harness from an interface between an interior area and an exterior area of a vehicle compartment to a protector provided in the exterior area, the grommet comprising:

a panel fitting tubular portion including a first end and a second end, the first end of the panel fitting tubular portion being at the interface between the interior area and the exterior area; and an extension tubular portion including a first end and a second end, the first end of the extension tubular portion being connected to the second end of the panel fitting tubular portion so that the extension tubular portion extends from the second end of the panel fitting tubular portion to the protector, the second end of the extension tubular portion connecting to the protector via a fitting portion between the protector and the second end of the extension tubular portion, the fitting portion having a water stop treatment is applied thereto, wherein the interface between the interior area and the exterior area is higher in position than the fitting portion to which the extension tubular portion is connected in order to prevent water from infiltrating the interior area.

* * * * *